United States Patent
Pfister et al.

(10) Patent No.: US 9,501,835 B2
(45) Date of Patent: Nov. 22, 2016

(54) IMAGE MONITORING DURING AN INTERVENTIONAL PROCEDURE, X-RAY DEVICE, COMPUTER PROGRAM AND DATA MEDIUM

(71) Applicants: Marcus Pfister, Bubenreuth (DE); Jens Raab, Petersaurach (DE)

(72) Inventors: Marcus Pfister, Bubenreuth (DE); Jens Raab, Petersaurach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/568,975

(22) Filed: Dec. 12, 2014

(65) Prior Publication Data

US 2015/0178886 A1 Jun. 25, 2015

(30) Foreign Application Priority Data

Dec. 20, 2013 (DE) ........................ 10 2013 226 975

(51) Int. Cl.
 *G06K 9/00* (2006.01)
 *G06T 7/00* (2006.01)
 *G06T 5/50* (2006.01)

(52) U.S. Cl.
 CPC .............. *G06T 7/0083* (2013.01); *G06T 5/50* (2013.01); *G06T 2207/10116* (2013.01); *G06T 2207/20221* (2013.01); *G06T 2207/30021* (2013.01);

(Continued)

(58) Field of Classification Search
 CPC ................ A61B 19/5244; A61B 2019/5265; A61B 2019/5287; A61B 6/487; A61B 6/504; A61B 6/5211; A61B 6/5247; A61F 2/82; G06K 2209/057; G06T 2207/10081; G06T 2207/10121; G06T 2207/30021; G06T 2207/30048; G06T 7/0024
 USPC .................................................. 382/128, 132
 See application file for complete search history.

(56) References Cited

U.S. PATENT DOCUMENTS

2005/0182295 A1* 8/2005 Soper ................... A61B 1/0008
 600/117
2007/0038061 A1* 2/2007 Huennekens .......... A61B 6/504
 600/407

(Continued)

FOREIGN PATENT DOCUMENTS

DE 102010012621 9/2011
DE 102010041735 4/2012

OTHER PUBLICATIONS

German Office Action cited in DE 10 2013 226 975.7, Mailed Oct. 12, 2014.

(Continued)

*Primary Examiner* — Tom Y Lu
(74) *Attorney, Agent, or Firm* — Lempia Summerfield Katz LLC

(57) ABSTRACT

A method is provided for image monitoring during an interventional procedure by at least one instrument in a patient's vascular system having vessels. The method includes checking, using positional data of the instrument, whether at least a part of the instrument lies outside of the vessels described by the vascular dataset. If at least a part of the instrument lies outside of the vessel through which the instrument is guided and which is described by the vascular dataset, the method further includes determining an adjusted centerline for the vessel in such a way that the part of the instrument molds itself to fit the boundary of the vessel described by the adjusted centerline, updating the vascular dataset on the basis of the adjusted centerline, and determining the overlay image from the updated vascular dataset.

20 Claims, 6 Drawing Sheets

(52) U.S. Cl.
CPC ................ *G06T2207/30101* (2013.01); *G06T 2207/30172* (2013.01)

(56) References Cited

U.S. PATENT DOCUMENTS

| | | | | |
|---|---|---|---|---|
| 2008/0147086 | A1* | 6/2008 | Pfister | A61B 19/52 606/130 |
| 2009/0281452 | A1* | 11/2009 | Pfister | A61B 6/12 600/567 |
| 2010/0222671 | A1* | 9/2010 | Cohen | G06T 7/0022 600/424 |
| 2011/0201915 | A1* | 8/2011 | Gogin | A61B 5/0456 600/407 |
| 2011/0235876 | A1 | 9/2011 | Pfister et al. | |
| 2012/0082363 | A1 | 4/2012 | Pfister | |
| 2012/0238871 | A1* | 9/2012 | Pfister | A61B 6/12 600/431 |

OTHER PUBLICATIONS

James et al., Skinning Mesh Animations, 2005, pp. 399-407, vol. 24, No. 3, ACM Transactions on Graphics.

Levoy, Efficient Ray Tracing of Volume Data, Jul. 3, 1990, pp. 245-261, vol. 9, ACM Transactions on Graphics.

Yoshizawa et al., Skeleton-Based Variational Mesh Deformations, 2007, vol. 26, No. 3, Eurographics.

* cited by examiner

IMAGE MONITORING DURING AN INTERVENTIONAL PROCEDURE, X-RAY DEVICE, COMPUTER PROGRAM AND DATA MEDIUM

CROSS-REFERENCE TO RELATED APPLICATIONS

This application claims the benefit of DE 10 2013 226 975.7, filed on Dec. 20, 2013, which is hereby incorporated by reference in its entirety.

TECHNICAL FIELD

The embodiments relate to a methods, X-ray devices, computer programs, and non-transitory data media for image monitoring during an interventional procedure by at least one instrument in a patient's vascular system having vessels, wherein at least one two-dimensional or three-dimensional preoperative vascular dataset including centerlines of the vessels and a description of the boundary of the vessels is used to generate an overlay image depicting the vascular system for the purpose of overlaying an X-ray image depicting the instrument during the intervention, wherein the X-ray image and the vascular dataset are registered with one another.

BACKGROUND

Interventional procedures of different types in a vascular system, in particular the blood vascular system, of a patient have already been proposed. In such instances, a suitable instrument, a catheter for example, on which further treatment instruments may be arranged where necessary, is guided through the vascular system to the treatment site. Image monitoring may take place so that the positioning of the instrument and the treatment may be monitored. For this purpose X-ray images, in particular fluoroscopic images, are acquired in which the instrument may be clearly identified. That said, however, fluoroscopic images reveal the vascular system less clearly, so it is known in this regard to use a vascular dataset which contains the anatomical information relating to the vascular system and from which it is possible to generate overlay images that may be superimposed on the X-ray image to achieve an anatomically exact fit and in this way significantly facilitate orientation in the vascular system for the person carrying out the intervention. The vascular dataset is used because it is not desirable to be obliged to resort constantly to contrast agent during the intervention in order to make the vessels of the vascular system recognizable.

It is known for example to acquire an image dataset of the vascular system preoperatively, e.g., preinterventionally, for example as a two-dimensional or three-dimensional angiogram. In the two-dimensional or three-dimensional image dataset, at least some, (or, in some embodiments, all), of the vessels may be located automatically, thereby producing the vascular dataset. Segmentation techniques may be used, for example. The information relating to the course and the boundary of the vessels is then used to superimpose the anatomical information on the X-ray image. In this case, the course of the vessels may be described by a centerline, wherein the boundaries of the vessel may be indicated in addition, for example, also relative to the centerline. A well-known example that is representative of the modeling of vessels in a vascular system uses so-called "meshes," in which the boundary of the vessels is considered as composed of in particular triangular mesh elements. The mesh elements may be assigned to a point on the medial line of the vessel, the line often being referred to as the "centerline", which provides that for a known point on the centerline the mesh elements or rather their location may be determined by a well-known transformation rule. However, modelings of vascular systems are also known in which the boundary is described by a function, which may then also be stored relative to the centerline, in particular therefore parameterized by the position on the centerline.

An example of an interventional procedure in the vascular system of a patient is the repair of abdominal aortic aneurysms. An abdominal aortic aneurysm (AAA) is a vessel dilatation in the abdominal aorta. This is treated by insertion of a vascular prosthesis called a "stent graft." For this purpose, guidewires and catheters may be introduced as instruments into the aorta by way of the patient's groin, by way of which the stent grafts may be inserted, in which case it is also conceivable to assemble the final stent from part-stents, (e.g., when the stent graft is to include the leg arteries as well). An example of this is the use of an aortic stent onto which a stent for the leg artery is "flanged" through a so-called "fenestration."

The positioning of the vascular prostheses or stents is performed with extreme precision in order to avoid branch vessels becoming inadvertently occluded and suchlike.

A problem with such overlaid representations, which are based on information about the vascular system that is stored in a vascular dataset after having been obtained at an earlier time, is that the process of introducing the instrument itself may alter the vascular anatomy in comparison with the earlier time. If, for example, extremely stiff instruments are introduced, the anatomy, specifically the vessel through which the instrument is currently being guided, becomes deformed. If this deformation is not corrected in the overlay image, the consequence is an inaccuracy and a misregistration during the overlay, with the result for example that an instrument may appear at least partly outside a vessel. This may lead to uncertainties during the intervention, in particular when the overlay serves as an aid to navigation in the vascular system. It may also be noted at this juncture that the overlay image does not necessarily have to be an abstract image, but may include image data of the image dataset on which the vascular dataset is based. Frequently, however, it is mainly the boundaries of the vessels of the vascular system that are depicted. It may furthermore be pointed out also that a registration between the vascular dataset and the X-ray image is provided to achieve the anatomically correct overlay. This may be given by a registration that is present, for example, when the image dataset on which the vascular dataset is based was acquired by the same image acquisition device or X-ray device. It is also possible in this case to perform a conventional 2D-2D registration, a 3D-2D registration between the X-ray image, or an X-ray image recorded using the same acquisition geometry and the image dataset in the case of a patient remaining motionless.

DE 10 2010 012 621 A1 discloses a method and a device for automatically adapting a reference image. What is proposed therein is an adaption of a reference image that automatically corrects displacements, which may be brought about as a result of instruments being introduced, e.g., when a stent is inserted in an aorta. Toward that end it is aimed to distort the reference image in such a way that a current vessel course and a vessel course assumed from the position of the instrument are congruent once more, wherein it is intended that a smooth vessel course is to be preserved and various boundary conditions are to be taken into account, though without an actual procedure being disclosed. It was proposed to use the central line of an instrument located outside of a vessel as a new centerline of the vessel. However, this makes no allowance whatsoever for the specific actual circumstances.

SUMMARY AND DESCRIPTION

The scope of the present invention is defined solely by the appended claims and is not affected to any degree by the statements within this summary. The present embodiments may obviate one or more of the drawbacks or limitations in the related art.

The object is therefore to adapt the vascular data during the image monitoring that provides an improved reflection of the actual situation within the vascular system during the interventional procedure and so allows improved orientation.

In order to achieve this object, the following acts are provided in a method of the type cited in the introduction: (1) checking, using positional data of the instrument, whether at least a part of the instrument lies outside of the vessels described by the vascular dataset; (2) if at least a part of the instrument lies outside of the vessel through which it is guided and which is described by the vascular dataset, determining an adjusted centerline for the vessel in such a way that the part of the instrument molds itself to the boundary of the vessel described by the adjusted centerline, (3) updating the vascular dataset on the basis of the adjusted centerline, and (4) determining the overlay image from the updated vascular dataset.

In this way, a solution is presented in which the deformed vessel optimally and smoothly molds itself to fit the reconstructed instrument or rather the instrument described by the positional data. In other words, the method does not proceed on the basis of the case that the central line of the instrument defines the new, adjusted centerline, but assumes that since the instrument produces the alteration itself through interaction with the vessel wall, the instrument correspondingly molds itself to fit the vessel wall. The adjusted centerline in the regions in which the instrument (apparently) protrudes from the vascular system is therefore determined in such a way that the part of the instrument molds itself to the boundary of the vessel described by the adjusted centerline.

In this case, the X-ray image may be in particular a fluoroscopic image, while the instrument will often be a catheter or guidewire. Treatments introduced through the catheter, (e.g., a stent), may also be considered as an instrument, in which regard it may be noted that the method self-evidently does not have to be restricted to the tracking of a single instrument. That positional data, however, may also be acquired for a plurality of instruments, in particular when, for example, a number of catheters are used, and their position within the vascular system may be checked. In this case, if the instrument appears to lie outside of the vascular system, the corresponding adjustments may be made to the vascular data. In this case, when the check to determine whether at least a part of an instrument is located outside of the vessel described by the vascular dataset takes place, the boundaries of the vessels are referred to, which provides a part lying outside of a vessel lies outside of the boundaries of the vessel.

The method may be applied in the case of an intervention in the aorta, since the aorta has a much larger diameter than the instruments used, though it holds that the method may be applied whenever the diameter of the vessel through which the instrument is guided is at least in part greater than the dimensions or the diameter of the instrument. Certain embodiments may furthermore provide that when a diameter of the instrument substantially coincides with the diameter of the vessel through that the instrument is guided. For example, the diameter of the instrument lies in a tolerance range around the diameter of the vessel, in particular is a maximum of 10% smaller than the diameter of the vessel, a central line of the instrument resulting from the positional data is nonetheless assumed as a new, adjusted centerline of the vessel, since in this special case this likewise allows a "molding" to fit the boundary of the vessel with a negligible error, but with lower computational overhead.

In order to perform the method, vascular data of the vascular dataset is therefore necessary in the first instance, that is to say, information about the vessel course in the vascular system. This is described by the centerlines of the vessels; the course of the vascular lumen, (e.g., the boundary of the vessels), is stored in parameterized form based on the position on the centerline or at least may be parameterized by way of the same. In this case, it may be provided that the vascular data is determined at least partly automatically, in particular through segmentation, from a three-dimensional preinterventional image dataset and/or a two-dimensional image dataset acquired by digital subtraction angiography (DSA). The vascular data may therefore be derived, for example, from a three-dimensional volume image dataset registered to the X-ray device (and consequently the X-ray image), in which case it may be a matter for example of a previously performed CT angiography or else a C-arm CT acquired immediately prior to the intervention. Alternatively, two-dimensional reference images, in particular DSA images, may also form the image dataset from which the vascular dataset was derived. An automatic segmentation of the corresponding image dataset lends itself as suitable, in particular when the image acquisition is performed after contrast agent has been administered. It is, however, also conceivable here that the vessel course is determined at least partly manually, for example, by a corresponding marking on the part of a user.

Various models are conceivable in order to describe the vascular system in the vascular dataset. Thus, it may be provided that the boundary is described by mesh elements assigned or assignable to different points on the centerline. This therefore provides that the boundary is described by mesh elements, in particular in the form of triangles (e.g., vertices), as is already known in branches of computer graphics. Each mesh element (e.g., vertex) may be assigned a point on the centerline, for example through projection of the vertex onto the centerline. The location of the mesh elements (e.g., vertices) in the three-dimensional space for different positions on the centerline is defined with the aid of the segmentation performed, for example, thereby resulting in a description of the course of the vessels by the centerline and the boundary in particular by the mesh elements.

It is additionally, or alternatively, also possible for the boundary to be described by a function parameterized with the course of the centerline. The boundaries of the vessel may therefore also be given by mathematical descriptions, for example, a higher-order polynomial or another suitable function.

Since the method determines an adjusted centerline in the case of a given, original centerline of the vessel through which the instrument is guided, and the location of the instrument described by the positional data, such that the deformed vessel adapts itself to fit the instrument described by the positional data as smoothly as possible, it may be provided with particular advantage when mesh elements are used to describe the boundary that the updating of the vascular dataset to the at least one new centerline takes place using a skeleton-based transformation. In skeleton-based transformation, which is already known in the prior art from other application fields, in particular computer graphics, with reference being made by way of example to the article by Shin Yoshizawa et al. titled "Skeleton-based Variational Mesh Deformations," Eurographics 2007, Vol. 26 (2007), Issue No. 3, it is therefore also assumed that a transformation of a centerline is used in order to represent the deformation. The individual mesh elements (e.g., vertices) are transformed from the original to the adjusted centerline, the centerline point assigned to a vertex/mesh element being located initially, whereupon, since the rule for representing the mesh element in relation to an assigned centerline point is known, the transformed mesh element may be determined by applying the rule starting from the new, adjusted centerline point. It is pointed out that, in addition to the skeleton-based transformation, it is also possible to use any desired centerline-based mesh transformation.

A further prerequisite for performing the method is to detect and track the introduced instrument or instruments, consequently to determine the positional data. For this purpose, it may be provided in actuality that positional data is determined through evaluation, in particular segmentation, of the X-ray image and/or by a position-determining device and/or on account of an input by a user. The positional data may be determined here by evaluation of the X-ray images, in particular, the fluoroscopic images, in which case for example a segmentation of the instrument may take place in the image data of the X-ray image. It is also possible for the evaluation of the X-ray images to happen semi-automatically or manually, for example, in that a user marks the instrument in the image data of the X-ray image or suchlike. A further source for positional data is a position-determining device, for example, a tracking of the instrument based on electromagnetic interaction or suchlike.

As has already been explained, the embodiments determine an adjusted centerline in such a way that the new vessel course, in particular also the course of the boundary, corresponds as exactly as possible to the deformation process taking place in the actual vessel anatomy, wherein the instrument "molds" itself to fit the deformed vessel as smoothly as possible. In this case, it may also lead to the situation whereby it is the tip of the instrument that appears to protrude from the vessel and/or a rear part of the instrument only just captured by the positional data, with the result that the further course is initially unknown. This stands in contrast to situations in which a part of the instrument continued on both sides by known positional data appears to protrude from the vascular system, for in that case it is possible to locate a smooth transformation of the centerline, since from a certain point the instrument lies in the vessel again on both sides.

It is provided in an embodiment that the instrument course described by the positional data is extrapolated in order to determine the adjusted centerline. It is therefore possible in the above-described cases, in which either the tip of the instrument or a part of the instrument only partly described by positional data appears to protrude from the vascular system, but also in principle, to perform an extrapolation in order to be able to usefully continue an initiated deformation. This is a case that may occur in practice, since it is often the tip of the instrument, when the latter is being advanced through the vascular system, which leads to the deformations. On the other hand, the length of the instrument, about which positional data is available, may be smaller than the volume size of the vascular system, (e.g., in image-based reconstruction of the positional data from two fluoroscopic images), since the two-dimensional image section is often smaller than the complete (e.g., segmented) vascular system. The aim of the extrapolation is, on the one hand, a maximally precise reproduction of the actual deformation, and, on the other hand, the smoothest possible continuation of an adjusted centerline. In this case, the extrapolation may be understood as a notional continuation of the instrument; it is not important in this context whether the instrument actually continues to exist there, for example, because the extrapolation is performed starting from the tip, but rather the essential starting point is the maximally exact description of the occurring deformation which is to lead to the updating of the vascular dataset. The extrapolation of the positional data may therefore also be a method act preceding the determination of the regions in which an adjustment of the centerline is required.

In this case, a distinction is beneficially made between regions ahead of the instrument and the extrapolation of parts of the instrument that have not been captured. For the first case, it may be provided that the extrapolation is performed in regions ahead of the instrument, therefore a continuation of the instrument tip, by determining a course leading back smoothly to the current centerline. In this way, a deformation in physiologically irrelevant regions is avoided and the smoothness provided in that the instrument is notionally extended such that it approaches the original centerline once again as smoothly as possible. In an embodiment, it may be provided in this case that the course is described by a sigmoid function and/or a polynomial and/or a spline function and/or the return to the current centerline is effected over a predefined length or a length dependent on a distance of the instrument located outside of the vessel from the boundary of the vessel at the starting point of the extrapolation. For example, parameters of a function that describes a maximally realistic deformation of the vessel ahead of the instrument tip may therefore be adjusted in order to find a smooth continuation to the centerline that describes the deformation as anatomically meaningfully/correctly as possible. Sigmoid functions have proven particularly useful for this purpose, though other extrapolations, for example based on polynomials or spline functions, are also conceivable. The length over that the return to the current, not yet adjusted centerline takes place may for example be permanently predefined, in particular lie in the range of 2-3 cm, or else also be dependent on how far outside of the vessel the instrument tip appears to be located.

In the case of a non-captured part of the instrument, the extrapolation of the non-captured part, for which no positional data is available, is performed as a function of characteristic data of the non-captured part and/or linearly. If no additional boundary conditions or characteristics of the instrument are known, it is conceivable to extend the instrument linearly "backwards," though the characteristics of the instrument and its environment may be taken into account. An expedient approach in particular in this case is that during the extrapolation of the non-captured part of the instrument at least one fixed point is taken into account, in particular an entry site at which the instrument is inserted into the vascular system. If, therefore, special boundary conditions for the course of the instrument in the vascular system are known, for example, puncture sites at which the instrument was introduced into the vascular system, or other "fixed points," these may beneficially be included in the extrapolation.

Following this optional extrapolation, which is beneficially but ultimately essentially to be performed, of the instrument beyond the positional data, the regions of the vessels that have to be deformed in order to achieve an adjustment to the instrument may now beneficially be determined. If the instrument described by the positional data (and where appropriate extrapolated) runs inside the original vessel through which it is guided, no adjustment of the vascular dataset whatsoever is performed, since the instrument does not deform the vessel. If, however, the instrument described by the positional data runs outside of the original vessel through which it is guided, an adjustment of the vascular dataset is necessary, since the instrument has obviously deformed the vessel.

A particular embodiment provides for the detection of parts of the instrument lying outside of the vessel through which the instrument is guided. In particular, parallel connecting lines and/or connecting lines perpendicular to the current centerline of the vessel are drawn from the current centerline of the vessel to a central line of the instrument determined from the positional data and a part of the instrument lying outside of the vessel is established for connecting lines intersecting the boundary of the vessel. This approach is known as "ray tracing," in which connecting lines are calculated between the points of the original centerline and the corresponding points of the instrument reconstructed (and where appropriate extrapolated) on the basis of the positional data. If the connecting lines do not intersect the boundaries, the instrument lies inside the lumen; if, on the other hand, the connecting lines do intersect the boundary, the latter lies between the instrument and the centerline, so the instrument is apparently located outside of the vascular lumen.

The results of the ray tracing may be used further for the now following construction of the adjusted centerline. Thus, it may actually be provided that in order to calculate the adjusted centerline in the region of the part located outside of the vessel the current centerline is displaced at least by the portion of the connecting line lying outside of the boundary. A displacement that yields the adjusted centerline is therefore determined for the points of the original centerline. The displacement again results from the ray tracing performed, for if the connecting lines do not intersect the boundary, the instrument lies inside the lumen and the vessel is not deformed at this point, so the displacement is equal to zero. If, however, the connecting line $C_i \rightarrow D_i$ intersects the boundary at the point $S_i$, the instrument lies outside of the vascular lumen at the point i and the vessel is deformed, which may happen for example such that the cutting edge lies on the instrument. This is achieved by a displacement of the point of intersection and hence the centerline by the vector $V_i = D_i - S_i$. In this case, however, in a particular embodiment, a finite extension of the instrument may also be taken into account, such that it may be provided that the current centerline is displaced in addition by a thickness of the instrument around the central line, with the result that for example the cited displacement vector $V_i$ may be lengthened by the radius D of the instrument: $V_i = V_i * (\|V_i\| + D)/\|V_i\|$.

Calculating the displacement vector $V_i$ in this way for each original centerline point $C_i$ yields the new, adjusted centerline $C'$. If a mesh is used for describing the boundary, the skeleton-based transformation already described hereinabove may then be used, for example, in order to obtain the adjusted, updated vascular dataset.

It may be pointed out at this juncture that physiological boundary conditions may also be taken into account in the generation of the new, adjusted centerline. An embodiment accordingly provides that when the adjusted centerline is determined at least one boundary condition referred to the anatomy of the vascular system is taken into account, in particular a boundary condition directed to fixed points on the centerline and/or to an avoidance of loops and/or to conservation of the length. Fixed points may be for example branches of other vessels from the vessel through which the instrument is guided, for example, the branch of the lumbar artery, since in most cases a deformation of the vessel will not take place at such positions. It is furthermore useful to take into account topological boundary conditions, for example, in order to prevent the centerline having loops that are not meaningful anatomically. In addition, a conservation of the length may also be taken into account, since an introduced instrument constitutes no obstruction to the length of the centerline of the vessel. The boundary conditions may be taken into account, for example, within the scope of an optimization method for determining the optimal adjusted centerline, for example, starting from the determined displacement vectors.

A development may provide that the adjusted centerline is smoothed before the vascular dataset is updated. A concluding smoothing of the type may be advantageous when, for example, discrete points on the centerline lying further apart from one another are considered.

An embodiment variant furthermore provides that an expansion and/or compression of the boundary is permitted, in particular as a function of physiological background information. Under certain boundary conditions, it may therefore also be conceivable to allow the boundary to be compressed or stretched during the deformation.

In addition to the method, the embodiments also relate to an X-ray device including a control device embodied to perform the method. All statements made with regard to the method may be applied analogously to the X-ray device, by which the cited advantages may likewise be obtained. Thus, for example, the X-ray device may include an optional extrapolation unit for extrapolating the instrument beyond the positional data, a checking unit that establishes in which regions an adjustment of centerlines is necessary, and an adjustment unit which carries out the actual adjustment. Functional units present anyway may be an overlay unit for determining and displaying the overlaid representation and a control unit for acquiring X-ray images.

In a beneficial embodiment, the X-ray device may be an X-ray device having a C-arm on which an X-ray tube assembly and an X-ray detector are arranged opposite one another. C-arm X-ray devices of the type are often employed within the framework of interventional procedures, since different angulations of the C-arm may be set in order to obtain an optimal view into the region of intervention, in actual fact the vicinity of the instrument tip. The embodiment of the control device for performing the method now provides the overlay representation of the overlay image with the X-ray image to be obtained directly on a display device, for example, a monitor, of the X-ray device with corrected and updated vascular dataset and in this manner optimally support the intervention.

It may also be noted here that the method may be extended to all procedures that benefit from the overlaying of prior information, in particular reference images (e.g., overlay images), for example, in addition to a treatment of an abdominal aortic aneurysm, also the replacement of aortic valves or cardiac valves, interventions in coronary blood vessels, and suchlike.

The embodiments furthermore relate to a computer program that performs the acts of a method when the program is executed on a computing device. The computing device may in this case be for example the control device of an X-ray device.

Finally, the embodiments also relate to a non-transitory data medium, for example a CD-ROM, on which a computer program is stored.

DETAILED DESCRIPTION

The below-described exemplary embodiment of the method relates to the image monitoring taking place during interventions in the blood vascular system of a patient, in the present instance, by way of example, in the aorta, (e.g., in order to treat an abdominal aortic aneurysm). The image monitoring, which takes place by acquisition of X-ray images (e.g., fluoroscopic images) at regular intervals by a C-arm X-ray device, is to be supported by an overlaid representation of the vascular system that is intended to facilitate orientation and is based on a vascular dataset registered to the X-ray device and therefore the X-ray images and describing the course of the vessels and their boundary. In this case, the vascular dataset was determined, as is known, through evaluation of a preinterventionally acquired image dataset, in this instance a CT angiography dataset, in that the vessels were segmented in the image dataset and a corresponding description was stored. The structure of the vascular data stored in the vascular dataset is such that a centerline is stored for each vessel. The boundary of the vessels is described by mesh elements, called vertices, which in the present instance are triangular. Specific mesh elements may be assigned to different points on the centerline, for example, by projection onto the centerline, such that it is known, starting from the point on the centerline, where the mesh element is located relative to the centerline, and in which orientation. Such representations of surfaces as meshes are already known from the field of computer graphics. Such a modeling of the vascular system in the vascular dataset is also used in the present exemplary embodiment.

Figure 1:
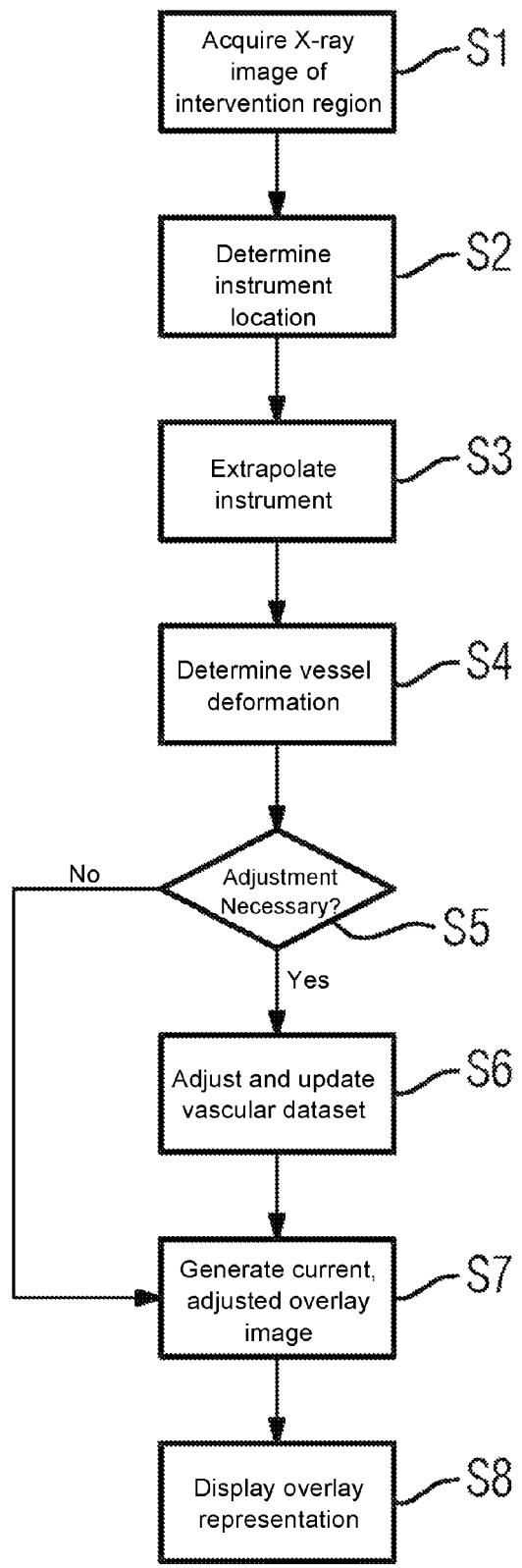
FIG. 1 depicts a flowchart of an exemplary embodiment of the method.
Figure 2:
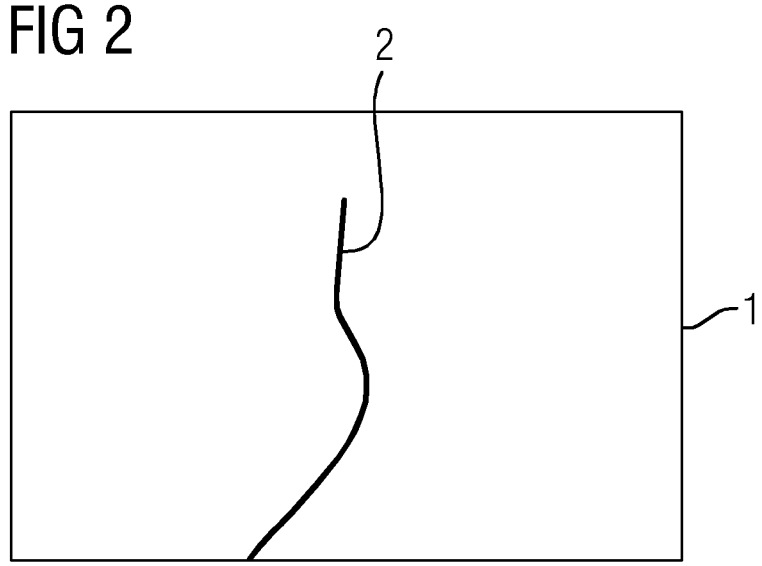
FIG. 2 depicts a schematic view of an example of an acquired X-ray image.

FIG. 1 depicts a flowchart of the method during the image monitoring. In this case, the method according to FIG. 1 is performed whenever, as happens in act S1, an X-ray image of the intervention region is acquired. Such an X-ray image 1 acquired as a fluoroscopic image is depicted schematically in FIG. 2. The location of the instrument 2 in the X-ray image 1 may be identified in FIG. 2 while the vessels and the structure of the vascular system are not discernible from the X-ray image 1, however.

Figure 3:
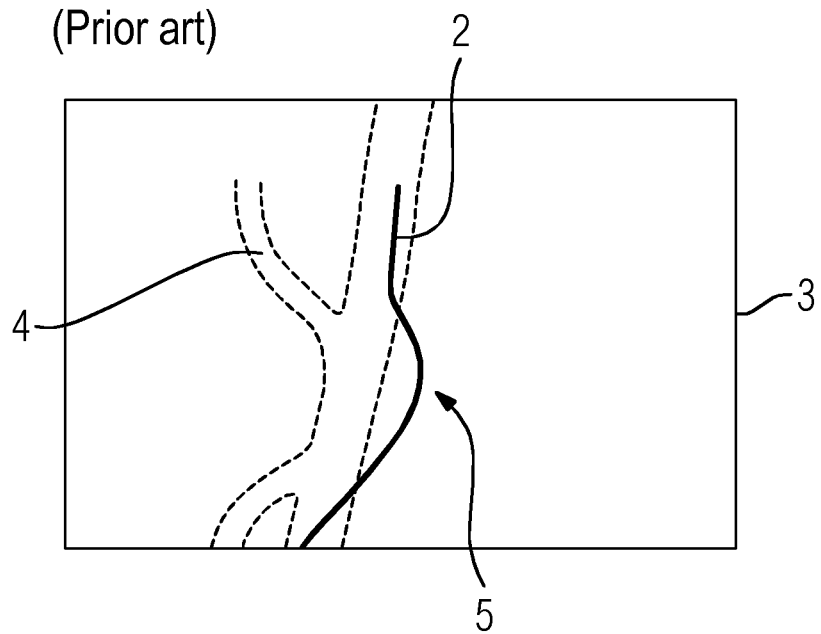
FIG. 3 depicts an example of an erroneous overlay according to the prior art.

It may nonetheless happen that the instrument 2 itself exerts an influence on the vessels, the latter consequently being deformed when the instrument 2 is guided through the vessels. If the vascular dataset containing information about the vascular system at a different point in time is then used unmodified, a situation as depicted by way of example in FIG. 3 may result. In the overlay representation 3 depicted in FIG. 3, the X-ray image 1 containing the instrument 2 is overlaid in an anatomically correct manner with an overlay image generated from the vascular dataset such that a reproduction 4 of the vascular system is also included. That said, however, the effect in a region 5 is as though the instrument 2 were located outside of the vessel through that the instrument is guided. This effect is undesirable and is eliminated.

Toward that end, positional data of the instrument 2, insofar as it is visible in the X-ray image 1, is determined by evaluation of the X-ray image 1, specifically by segmentation, such that it is now known for this part of the instrument 2, where the latter is located. This may also be transferred to the vascular dataset, for the vascular dataset and the X-ray image 1 are registered with one another. The determination of the positional data just described takes place in act S2.

In act S3, the instrument reconstructed by the positional data is extrapolated, which provides in the present instance, also beyond the tip of the instrument that may be visible in the X-ray image 2. This is based on the knowledge that the tip of the instrument 2 may also be located outside of a vessel described by the vascular dataset, it being intended to avoid an abrupt jump in the adjustment of the vessel description in the vascular dataset at this point. This is achieved by the below-described extrapolation in act S3 of the method.

Figure 4:
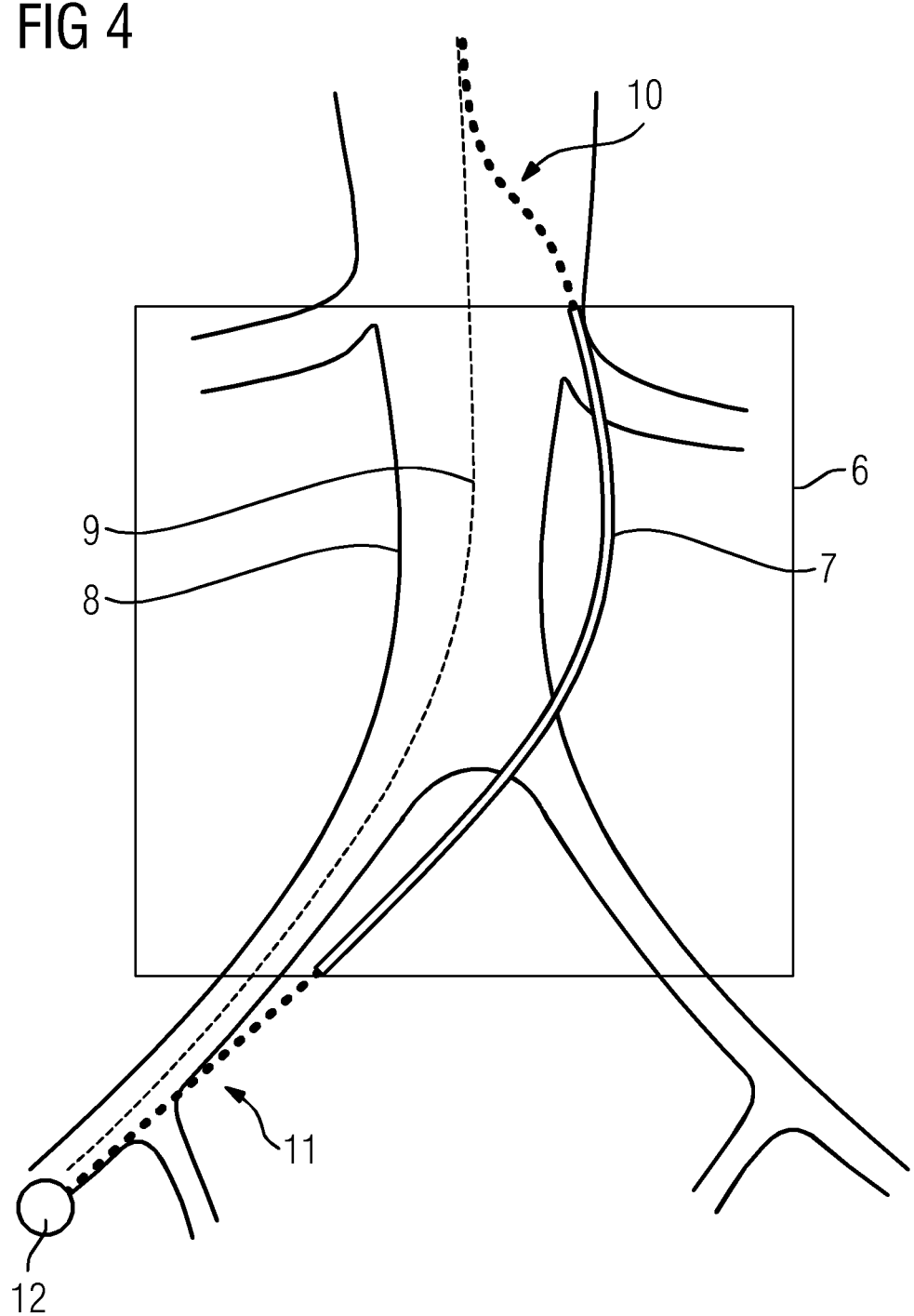
FIG. 4 depicts a schematic diagram illustrating an example of the extrapolation of the instrument.

This is explained in more detail by the schematic representation in FIG. 4. Here, the box 6 denotes the region in which positional data, indicated by the wide unbroken line 7, of the instrument is present. Also depicted are vessels 8 of the vascular system, the centerline 9 also already being indicated for the vessel 8 through which the instrument is guided.

In the region 10 ahead of the instrument tip, a smooth continuation, which soon approaches the centerline 9 of the vessel 8, is achieved in that the further course is described by a sigmoid function that again moves within a predetermined length in the range of 2-3 cm toward the centerline 9. Accordingly, a deformation in physiologically irrelevant regions is avoided and the smoothness provided in that the instrument is extended such that it approaches the original centerline 9 once more in the smoothest manner possible.

However, the instrument is also not captured completely, with the result that a non-captured rear part of the instrument exists in a region 11. There, the extrapolation is performed linearly or taking into account characteristics of the instrument, for example, the instrument's stiffness in the region 11, and taking into account fixed points. A fixed point of the type is the puncture point 2, likewise represented in FIG. 4, at which the instrument was introduced into the vascular system, in other words, the entry site. Just as in the region 10, the extrapolation is also indicated by a dotted line in the region 11.

If present, regions of the vessel or vessels through which the instrument is guided, which have to be deformed in order to achieve an adjustment to the instrument, are determined in act S4. If the instrument described and extrapolated by the positional data runs inside the original vessel, the centerline and the mesh do not need to be adjusted in this region, since the instrument has not deformed the vessel. If, on the other hand, the reconstructed instrument runs outside of the original vessel, an adjustment is made because a deformation has occurred. In the present example, these regions are identified by ray tracing.

This shall be explained in more detail with reference to the schematic diagram depicted in FIG. 5. Depicted there once again are the current, e.g., as yet unmodified, centerline 9 of a vessel through which the instrument is guided, and its boundaries 13. A central line 14 of the instrument may be determined from the positional data of the instrument, the central line therefore running in the center of the instrument. Within the scope of ray tracing, connecting lines 15 between the central line 14 and the centerline 9 of the vessel are now considered at regular intervals, a check being made to determine whether the connecting lines 15 have points of intersection with the boundary 13. This is the case in FIG. 5 in the region 16, though not in the regions 17. It may be concluded that in the region 16 the instrument does not lie inside the vascular lumen described by the vascular dataset.

In act S5 (cf. FIG. 1 once more), it is checked whether regions 16 in which an adjustment is necessary exist at all. If this not the case, act S6 is skipped. If, however, regions 16 are present in which the instrument appears to lie outside of the vessel, the vascular dataset is adjusted and updated in act S6. In this case, the procedure followed in the present example is as explained by FIG. 6.

Figure 5:
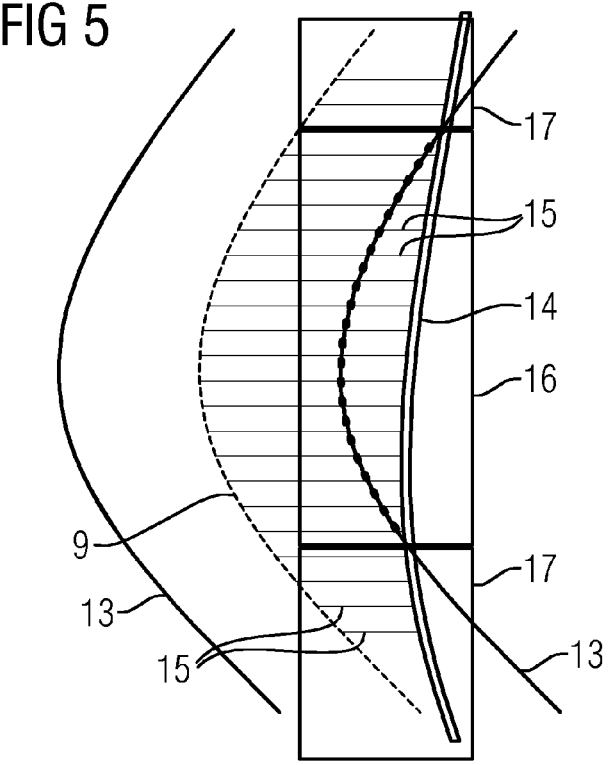
FIG. 5 depicts a schematic diagram illustrating an example of the determination of regions in which an adjustment is necessary.
Figure 6:
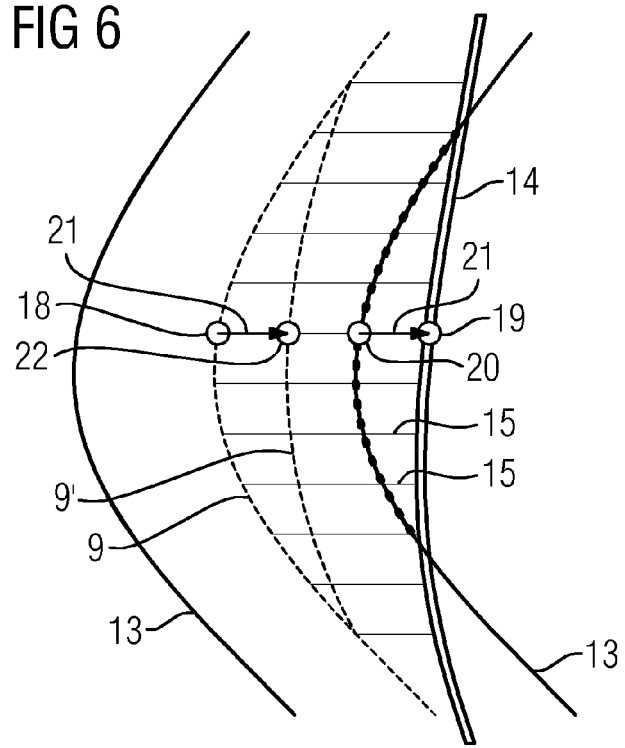
FIG. 6 depicts a schematic diagram illustrating an example of the displacement of the centerline of a vessel.

FIG. 6 depicts the situation of FIG. 5 in magnified form. For a connecting line 15, there may be seen the original centerline point 18, the corresponding central line point 19 on the central line 14, and the point of intersection 20 with the boundary 13. It may be seen that, between the point of intersection 20 and the central line point 19, a displacement vector 21 is produced that indicates how far away the instrument lies from the boundary 13.

Accordingly, this embodiment variant provides, proceeding on the basis of a thin instrument, in particular a catheter, to displace the centerline 9 by the resulting displacement vectors 21, with the result that in relation to a boundary associated with the new, adjusted centerline point 22, the central line 14 lies exactly on the boundary, therefore "molds" itself to fit the vessel wall. If the instrument has a greater thickness, it may be provided that the displacement vector 21 is extended by the radius of the instrument at the corresponding point of the instrument.

It is also pointed out that in the alignment of the centerline 9 to an adjusted centerline 9' account is taken of anatomical boundary conditions, for example anatomical fixed points at which a deformation is not conceivable, and suchlike. For example, the displacement vectors 21 may be determined initially in all regions 16, whereupon a maximally smooth course is achieved in an optimization method while complying with the anatomical boundary conditions.

Figure 7:
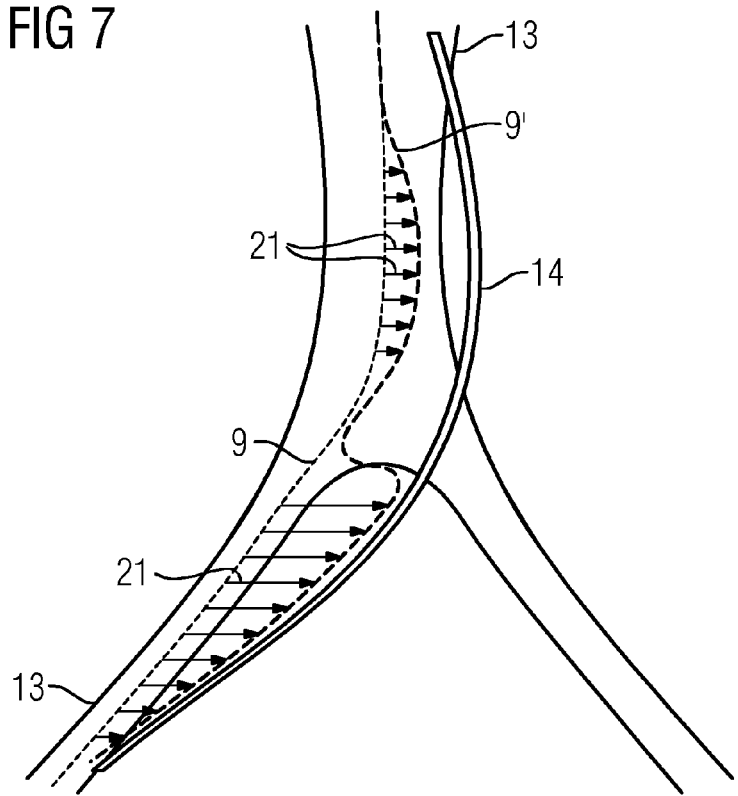
FIG. 7 depicts a schematic diagram illustrating an example of the overall displacement of a centerline.

FIG. 7 depicts in an example displacement vectors 21 as well as the original centerline 9 and the adjusted centerline 9' for a larger region of the vascular system.

Figure 8:
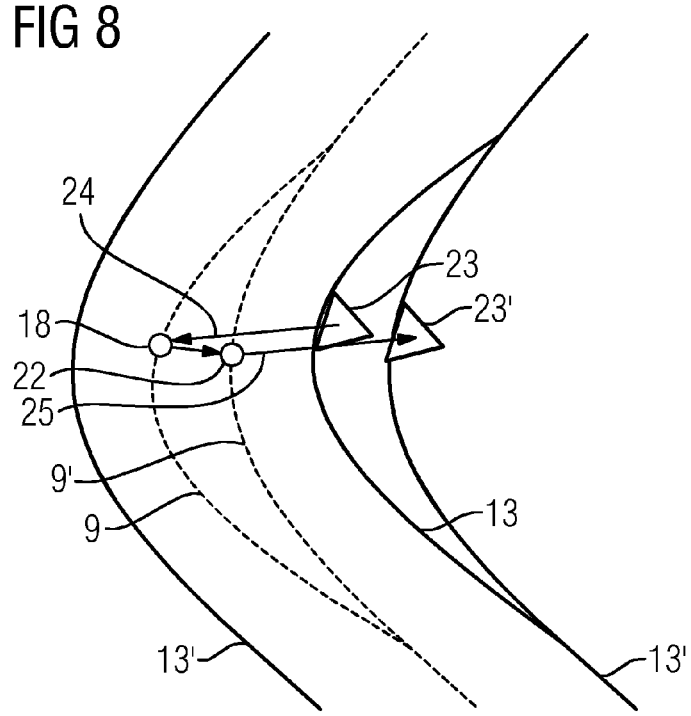
FIG. 8 depicts a schematic illustrating an example of the skeleton-based transformation.

The adjustment of the boundary 13 of the vessels with adjusted centerlines 9' is carried out according to the skeleton-based transformation, which is to be explained in more detail with reference to FIG. 8. Depicted there once again are the original centerlines 9 and the adjusted, new centerline 9', as well as, by way of example, a mesh element 23 of the original boundary 13, which mesh element is often also referred to as a vertex. According to the arrow 24, the mesh element 23 may be assigned a centerline point 18 on the centerline 9, so that it is therefore also known how the location of the mesh element 23 is in relation to the centerline point 18. This location relationship may now be used, starting from the displaced, adjusted centerline point 22 according to the arrow 25, in order to determine the adjusted position of the vertex 23' of the boundary 13'.

Thus, the entire vascular dataset is updated in act S6.

In act S7, the (updated) vascular dataset is then used in order to generate a current, adjusted overlay image, thereby resulting also in act S7 in the overlay representation from the X-ray image and the overlay image. This may be displayed in act S8.

Figure 9:
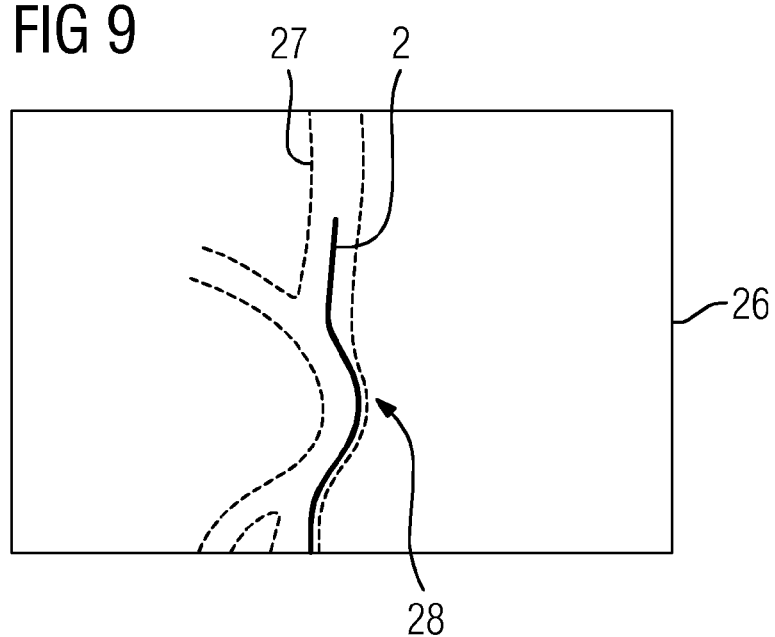
FIG. 9 depicts a schematic diagram illustrating an example of an overlay representation.

An example of such an overlay representation 26 resulting by the method is depicted in FIG. 9. Recognizable once again is the image of the instrument 2, which is now located completely inside the vessel 27 represented from the overlay image, which is depicted correspondingly deformed in the region 28. In this case, as may be seen, the instrument 2 causing the deformation molds itself to fit the vessel wall of the vessel 27. A person carrying out the intervention is consequently provided with an anatomically maximally correct, accurate basis for deciding on the further action to be taken.

Figure 10:
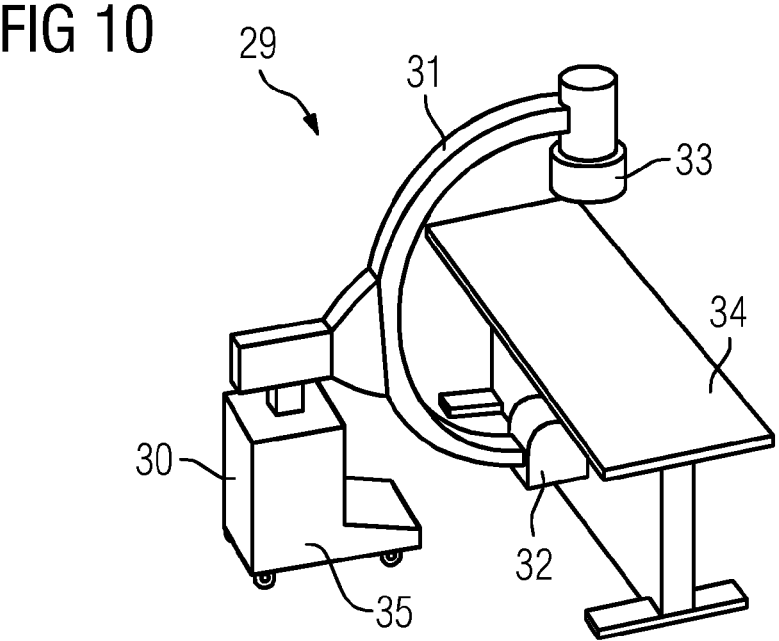
FIG. 10 depicts an example of an X-ray device.

FIG. 10, finally, depicts a schematic diagram depicting an X-ray device 29. This has a C-arm 31 that is carried by a mobile support assembly 30 and on which an X-ray tube assembly 32 and an X-ray detector 33 are arranged opposite one another. These may be moved into different angular positions in relation to a patient to be placed on a patient table 34.

The operation of the X-ray device 29 is controlled by a control device 35, merely indicated here, which is also embodied for performing the method.

For this purpose the control device 35 has not only a control unit by which the acquisition of the X-ray images, for example in act S1, is controlled, but also an evaluation unit for determining the positional data from the X-ray image. An extrapolation unit extrapolates the course of the instrument, which is described by the positional data, according to act S3, while a checking unit performs acts S4 and S5 according to FIG. 1. If necessary, an adjustment unit determines adjusted centerlines and, according to act S6, updates the vascular dataset in accordance with the adjusted centerlines. An overlay unit is provided for the purpose of determining the overlay representation from the overlay image and the X-ray image and for displaying the overlay representation (e.g., acts S7 and S8).

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for image monitoring during an interventional procedure by at least one instrument in a patient's vascular system having vessels, wherein at least one two-dimensional or three-dimensional preoperative vascular dataset comprising a centerline of a vessel and a description of a boundary of the vessel parameterized by the centerline is used to generate an overlay image depicting the vascular system for the purpose of overlaying an X-ray image depicting the instrument during the intervention, wherein the X-ray image and the vascular dataset are registered with one another, the method comprising:

checking, using positional data of the instrument, whether at least a part of the instrument lies outside of the vessel described by the vascular dataset;

determining an adjusted centerline for the vessel such that the part of the instrument identified to lie outside of the vessel is positioned at the boundary of the vessel described by the adjusted centerline;

updating the vascular dataset based on the adjusted centerline; and determining the overlay image from the updated vascular dataset.

2. The method as claimed in claim 1, wherein the vascular data is determined at least partly automatically through segmentation from a three-dimensional preinterventional image dataset, a two-dimensional data set, or the three-dimensional and the two-dimensional image dataset acquired by digital subtraction angiography.

3. The method as claimed in claim 2, wherein the boundary is provided by (1) mesh elements assigned or assignable to different points on the centerline, (2) a function parameterized with a course of the centerline, or (3) the mesh elements and the function parameterized with the course of the centerline.

4. The method as claimed in claim 1, wherein the boundary is provided by (1) mesh elements assigned or assignable to different points on the centerline, (2) a function parameterized with a course of the centerline, or (3) the mesh elements and the function parameterized with the course of the centerline.

5. The method as claimed in claim 4, wherein when the mesh elements are used, the vascular dataset is updated to the adjusted centerline using a skeleton-based transformation.

6. The method as claimed in claim 1, wherein a course of the instrument described by the positional data is extrapolated in order to determine the adjusted centerline.

7. The method as claimed in claim 6, wherein the extrapolation is carried out in regions ahead of the instrument by determining an extrapolation course leading back smoothly to a current centerline.

8. The method as claimed in claim 7, wherein the extrapolation course is described by one or more of: (1) a sigmoid function, (2) a polynomial, (3) a spline function, or (4) a return to the current centerline is effected over a predefined length or a length dependent on a distance of the instrument located outside of the vessel from the boundary of the vessel at a starting point of the extrapolation.

9. The method as claimed in claim 6, wherein the extrapolation of a non-captured part of the instrument for which no positional data is available is performed linearly, as a function of characteristic data of the non-captured part, or linearly and as the function of characteristic data of the non-captured part.

10. The method as claimed in claim 9, wherein, during the extrapolation of the non-captured part of the instrument, at least one fixed point is taken into account, the fixed point comprising an entry site at which the instrument is inserted into the vascular system.

11. The method as claimed in claim 1, wherein in order to detect the at least one part of the instrument lying outside of the vessel through which the instrument is guided, parallel connecting lines and/or connecting lines perpendicular to a current centerline of the vessel are drawn from the current centerline of the vessel to a central line of the instrument determined from the positional data, and
wherein the part of the instrument lying outside of the vessel is established for connecting lines intersecting the boundary of the vessel.

12. The method as claimed in claim 11, wherein, in order to calculate the adjusted centerline in the region of the part located outside of the vessel, the current centerline is displaced at least by the portion of the connecting line lying outside of the boundary.

13. The method as claimed in claim 12, wherein the current centerline is displaced by a thickness of the instrument around the central line.

14. The method as claimed in claim 1, wherein, when the adjusted centerline is determined, at least one boundary condition referred to an anatomy of the vascular system is taken into account, wherein the boundary condition is directed to one or more of the following: to fixed points on the centerline, to an avoidance of loops, or to conservation of a length.

15. The method as claimed in claim 1, wherein the adjusted centerline is smoothed prior to the updating of the vascular dataset.

16. The method as claimed in claim 1, wherein an expansion, compression, or expansion and compression of the boundary is permitted as a function of physiological background information.

17. The method as claimed in claim 1, wherein the positional data is determined through one or more of the following: (1) evaluation or segmentation of the X-ray image, (2) a position-determining device, or (3) on account of an input by a user.

18. An X-ray device for an interventional procedure, the X-ray device comprising:
a controller having a checking unit and an adjustment unit, the controller configured to:
check, using the checking unit, whether at least a part of an instrument in a patient's vascular system lies outside of a vessel described by a vascular dataset comprising a centerline of the vessel and a description of a boundary of the vessel paramerterized by the centerline; and
provide, using the adjustment unit, an adjusted centerline for the vessel such that the part of the instrument identified to lie outside of the vessel is positioned at the boundary of the vessel described by the adjusted centerline.

19. An apparatus comprising:
at least one processor; and
at least one memory including computer program code for one or more programs;
the at least one memory and the computer program code configured to, with the at least one processor, cause the apparatus to at least perform:
check whether at least a part of an instrument in a patient's vascular system lies outside of a vessel described by a vascular dataset comprising a centerline of the vessel and a description of a boundary of the vessel paramerterized by the centerline;
determine an adjusted centerline for the vessel such that the part of the instrument identified to lie outside of the vessel is positioned at the boundary of the vessel described by the adjusted centerline;
update the vascular dataset based on the adjusted centerline, and
determine an overlay image from the updated vascular dataset.

20. A non-transitory computer-readable storage medium having stored therein a computer program for controlling a target system when executed by a computer, the storage medium comprising instructions to:
check whether at least a part of an instrument in a patient's vascular system lies outside of a vessel described by a vascular dataset comprising a centerline of the vessel and a description of a boundary of the vessel paramerterized by the centerline;
determine an adjusted centerline for the vessel such that the part of the instrument identified to lie outside of the vessel is positioned at the boundary of the vessel described by the adjusted centerline;
update the vascular dataset based on the adjusted centerline; and determine an overlay image from the updated vascular dataset.

\* \* \* \* \*